United States Patent
Räsänen (10) Patent No.: US 6,529,572 B1
(45) Date of Patent: Mar. 4, 2003

(54) NETWORK INDEPENDENT CLOCKING IN A TELECOMMUNICATION SYSTEM

(75) Inventor: Juha Räsänen, Espoo (FI)

(73) Assignee: Nokia Telecommunications Oy, Espoo (FI)

( * ) Notice: Subject to any disclaimer, the term of this patent is extended or adjusted under 35 U.S.C. 154(b) by 0 days.

(21) Appl. No.: 09/269,709

(22) PCT Filed: Oct. 24, 1997

(86) PCT No.: PCT/FI97/00648

§ 371 (c)(1),
(2), (4) Date: Apr. 5, 1999

(87) PCT Pub. No.: WO98/19411

PCT Pub. Date: May 7, 1998

(30) Foreign Application Priority Data

Oct. 30, 1996 (FI) .................................................. 964376

(51) Int. Cl.[7] .............................................. H04L 23/00
(52) U.S. Cl. ........................................ 375/377; 375/354
(58) Field of Search ................................ 375/354, 295, 375/316, 317, 377, 222, 371, 356, 362, 365, 366; 370/503, 505, 511, 509

(56) References Cited

U.S. PATENT DOCUMENTS

| 3,985,963 A | | 10/1976 | Boutmy et al. ........ 179/15 BD |
|---|---|---|---|
| 5,276,688 A | | 1/1994 | Urbansky .................... 370/102 |
| 5,369,501 A | * | 11/1994 | Wilson et al. ............... 358/407 |
| 5,412,660 A | | 5/1995 | Chen et al. ............... 370/110.1 |
| 5,502,752 A | * | 3/1996 | Averbuch et al. ........... 375/377 |
| 5,694,432 A | * | 12/1997 | Hickman .................... 375/295 |
| 5,726,764 A | * | 3/1998 | Averbuch et al. ........... 358/403 |
| 5,740,214 A | * | 4/1998 | Rebec et al. ................ 375/377 |

FOREIGN PATENT DOCUMENTS

| WO | 92/15159 | 9/1992 |
|---|---|---|
| WO | 96/27960 | 9/1996 |

* cited by examiner

Primary Examiner—Tesfaldet Bocure
Assistant Examiner—Dung X. Nguyen
(74) Attorney, Agent, or Firm—Pillsbury Winthrop LLP Intellectual Property

(57) ABSTRACT

The invention relates to a method and equipment for network independent clocking in a telecommunication system, particularly in data transmission where the maximum data rate on a traffic channel is equal to the user data rate. In the invention a transmitter compares the network independent clock and the network clock to detect a slip and, upon detecting a slip, performs compensation of the network independent clock by changing the number of the redundant bits in user data. The user data is transmitted through a traffic channel to a receiver. The receiver, upon detecting the network independent clock compensation in the received user data, restores the original redundancy and temporarily adjusts the network independent clock so as to compensate for the change caused by the restoration of the redundancy in the outbound user data stream.

17 Claims, 3 Drawing Sheets

NETWORK INDEPENDENT CLOCKING IN A TELECOMMUNICATION SYSTEM

This application is the national phase of international application PCT/FI97/00648 filed Oct. 24 1997 which designated the U.S.

The invention relates to network independent clocking in a telecommunication system, particularly in data transmission where the maximum data rate of a traffic channel is equal to one of the user data rates at a terminal interface.

DESCRIPTION OF THE RELATED ART

Mobile systems generally mean different telecommunication systems that enable private wireless data transmission for subscribers moving within the system. A typical mobile system is a Public Land Mobile Network (PLMN). The PLMN comprises fixed radio stations (base stations) located in the service area of the mobile network. The radio coverage areas (cells) of the base stations provide a uniform cellular network. A base station provides a radio interface (air interface) in the cell for communication between a mobile station and the PLMN.

Another area of mobile systems includes satellite-based mobile services. In satellite system, radio coverage is obtained by satellites instead of terrestrial base stations. The satellites orbit round the earth and transmit radio signals between mobile stations (or User Terminals (UT)) and Land Earth Stations (LES).

Subscriber mobility requires similar solutions in satellite mobile systems as in the PLMNs, i.e. subscriber data management, authentication and location management of mobile subscribers, handover, etc. The satellite systems should also support similar services as the PLMNs.

One way of meeting the above requirements in satellite mobile systems is to use existing PLMN solutions. In principle this alternative is very straightforward since a satellite system can basically be compared to a base station system of a mobile system having a different radio interface. In other words, it is possible to use conventional PLMN infrastructure, where the base station system(s) is (are) a satellite system. In such a case, the same network infrastructure could, in principle, even contain both conventional PLMN base station systems and satellite 'base station systems'.

There are many practical problems, however, in adaptation of the PLMN infrastructure and a satellite system. A problem apparent to the Applicant is that a PLMN traffic channel and a traffic channel of a 'radio interface' in a satellite system differ considerably. Let us examine an example where the PLMN is the Pan-European digital mobile system GSM (Global System for Mobile Communication), and the satellite mobile system is the Inmarsat-P system that is currently being developed.

At present, a GSM traffic channel supports data transmission at user rates 2400, 4800, 7200 and 9600 bit/s. In addition to user data, status information on the terminal interface (control signals of a V.24 connection) is transmitted on the traffic channel in both directions. In transparent High Speed Circuit Switched Data (HSCSD) data service, it is also necessary to transmit synchronization information between subchannels. In synchronous transparent bearer services, the clocking information of network independent clocking (NIC) must also be transmitted through a transmission channel from transmitting terminal equipment to receiving terminal equipment via a transmission network, when the transmission network and the transmitting terminal equipment are not in sync with each other, i.e. the terminal equipment uses network independent clocking (e.g. internal clock). The above-mentioned additional information raises the bit rate at the radio interface to be higher than the actual user rate. The GSM radio interface rates corresponding to user rates 2400, 4800 and 9600 bits are 3600, 6000 and 12000 bits. These signals are subjected to different channel coding operations, which raise the final bit rate to about 22 kbit/s.

The Inmarsat-P satellite system requires that standard data rates up to 4800 bit/s (e.g. 1200, 2400, 4800 bit/s) can be transmitted on one traffic channel, and that standard data rates exceeding 4800 bit/s (e.g. 9600, 14400, 19200 bit/s, etc.) can be transmitted by using several parallel traffic channels, like in the HSCSD service of the GSM system.

In the Inmarsat-P satellite system, the data rate of one traffic channel at the radio interface is at most 4800 bits, which equals the user data rate of 4800 bits at the terminal interface. In a data service employing two traffic channels, the data rate at the radio interface equals the user data rate of 9600 bits at the terminal interface. A problem arises when not only the user data but also the above-described terminal interface status information and any inter-subchannel synchronization information should be transferred over the radio interface. Therefore the protocol data unit, i.e. frame structure, used by the satellite system at the radio interface should be defined to carry the above mentioned control and synchronization information over the radio interface.

One approach would be to use a GSM solution, i.e. a V.110-based frame structure, for the transmission of the status also at the radio interface of the satellite system. However, this would be a very complicated solution, and it would significantly reduce the user data rates available. A single traffic channel could not support the user data rate of 4800 bit/s since a V.110 frame structure and the terminal interface status information raise the actual data rate (radio interface rate) to be higher than 4800 bit/s. Therefore the highest standard user data rate on one traffic channel would be 2400 bit/s. For the same reason, a two-traffic-channel data service could not support the user rate of 9600 bit/s, but the highest standard user data rate would be 4800 bit/s (or in some systems 7200 bit/s). A corresponding decrease in the available data rates would also occur in data services employing more than two traffic channels. Such a solution, where the overhead information causes a significant loss of capacity, would not be satisfactory.

A similar problem can also arise when other types of radio interfaces, such as wireless telephone systems, are connected to the PLMNs.

A similar problem can also arise on other types of connections in which the radio interface rate is to be used as effectively as possible. For example, a new 14400 bids traffic channel has been planned for the GSM. In order that the terminal interface statuses and any other control information may be transferred over the radio path in addition to the 14400 bit/s user data, the radio interface rate, implemented on the present principles, must be higher than 14400 bit/s, about 18 kbit/s. A higher radio interface rate requires that the existing radio networks should be re-designed and the intermediate rate Transcoder/Rate Adaptor Unit (TRAU) increased so that only two subchannels could be put in a single 64 kbit/s timeslot in the HSCSD service (i.e. efficiency of a TRAU transmission link is impaired). The radio interface rate of 14400 bit/s, which does not cause such problems, can be formed, for example, from the present radio interface rate of 12000 kbit/s by enhancing the puncturing that follows channel coding. The actual user data rate, however, would then be below 14400 bit/s, if the new traffic channel were implemented on the same principles as the existing GSM traffic channels. It would thus be preferable to implement a user data rate of 14400 bids at a radio interface rate of 14400 bit/s.

The parallel Finnish patent applications 955,496 and 963,455 by the same Applicant describe a data transmission method in which the terminal interface status information and any other control or synchronization information are transmitted through a traffic channel in the redundant data elements of end-to-end protocols, such as the redundant parts of the protocol data units of user data or the start and stop bit positions of asynchronous data characters. The overhead information thus does not increase the number of the bits to be transmitted, so the transmission capacity of the traffic channel can be exactly the same as the user data rate at the terminal interface. In high-rate data transmission (HSCSD) a data link may comprise a group of two or more traffic channels, whereby the total capacity of the group of traffic channels can be the same as the user data rate at the terminal interface.

Network independent clocking NIC may be used in synchronous transparent bearer services for the transmission of clocking information from a transmitting terminal equipment to a receiving terminal equipment via a transmission network, when the transmission network and the transmitting terminal equipment are not in synch with each other, i.e. the terminal equipment uses network independent clocking (e.g. internal clock). This is also known as a plesiosynchronous case, since the clocks are nominally the same but originate from different clock sources. In a plesiosynchronous case, data bits are lost now and then during a long transmission session due to the overflow or underflow of the transmission buffer, if no NIC coding is used between the transmitter and the receiver.

BRIEF SUMMARY OF THE INVENTION

In the following, the use of the NIC in the GSM in MS-originated data transmission will be illustrated with reference to FIG. 1A. The MS-terminating data transmission is otherwise the same, but an interworking function (IWF) operates as a transmitter, a terminal adaptation function (TAF) as a receiver, and terminal equipment is replaced by a modem MODEM in the interworking function IWF of the mobile network, as shown in FIG. 1B.

The transmitter (TAF) receives user data DATA and a transmission clock $Clk_{TX}$, from the terminal equipment (TE). The transmitter (TAF), using the NIC (in a GSM network), compares the transmission clock Clk-rx of the terminal equipment TE with the network clock ClkGSM and detects a slip of the duration of a data bit.

If the slipping results from an overrate of the clock $Clk_{TX}$ of the terminal equipment TE (or modem MODEM) in respect of the network clock $Clk_{GSM}$, the transmitter (TAF) deletes one data bit from a predetermined bit position from the bit stream DATA (thereby reducing the number of the data bits to be transmitted toward the receiver (IWF)) and transmits the deleted bit outside the data bit stream DATA in a 5-bit NIC code, which also informs the receiver (IWF) of the event.

If, on the other hand, the slipping results from an underrate of the clock $Clk_{TX}$ of the terminal equipment TE (or modem MODEM) in respect of the network clock $Clk_{GSM}$, the transmitter (TAF) adds a fill bit to a predetermined bit position in the data bit stream DATA (thereby increasing the number of the data bits to be transmitted toward the receiver (IWF)) and transmits a NIC code outside the data bit stream DATA, the NIC code informing the receiver (IWF) of the event.

The receiver (IWF), which uses the NIC (in the GSM), monitors inbound NIC codes and operates accordingly:

If the received NIC code is neutral, the receiver (IWF) interprets the data in the inbound data bit stream in the normal manner.

If the received NIC code contains a data bit, the receiver (IWF) puts the data bit in a predetermined bit position in the inbound data bit stream and speeds up the transmission clock $Clk_{TX}$ toward the modem MODEM (or the terminal equipment TE) for a while so as to make room for the added bit in the bit stream.

If the received NIC code indicates that there is a fill bit in the inbound bit stream, the receiver (IWF) deletes the fill bit and slows down the transmission clock $Clk_{TX}$ toward the modem MODEM (or the terminal equipment TE) for a while so as to delete the 'gap' from the bit stream.

The receiving modem (or terminal equipment) thus obtains data at (approximately) the same frequency as data was transmitted in the transmitting terminal equipment TE (or modem), although the network clock $Clk_{GSM}$ is used on a GSM traffic channel.

The use of network independent clocking NIC is defined both in the ISDN network (ITU-T Recommendation V.110) and in the GSM network (GSM Recommendation 04.21). The principle in the two types of networks is the same except for the following exception: in the GSM it is possible to indicate only a slip that is of the duration of a full bit, whereas in the ISDN it is also possible to indicate a slip that is of the duration of a fraction of a bit.

If network independent clocking (NIC) is used on a traffic channel where there is no room for the control information to be transmitted outside the user data stream, the NIC codes must also be transmitted in the redundant parts of the user data protocol units, for example in accordance with the methods disclosed in the above-mentioned Finnish Patent Applications 955,496 and 963,455.

The use of the existing NIC codings in a case like this would set strict restrictions on the maximum frame length of the user data protocol for example for the following reasons:

The maximum frame length is determined by the fact that only 1-bit compensation is possible in the frames even when the whole 5-bit NIC code is transmitted in one frame. If the whole 5-bit NIC code could be transmitted in one user protocol data frame, the maximum frame length would be restricted to 1250 bytes.

In practice, the maximum frame length would be even shorter, since there is not enough room for the whole NIC code in the redundant bit positions in the most usual cases, i.e. when the user protocol uses a High-Level Data Link Control (HDLC) frame in which the redundant part is a 1-byte long address field. In a case like this, there are six redundant bits available in the address field. Two or three bits must be reserved for the transmission of terminal interface statuses. In addition, two or three bits are needed for in-band numbering of the subchannels and/or frames in high-rate data calls.

To eliminate this problem associated with the lack of bit positions in a frame, it would be possible to use the same mechanism as is currently used in V.110-frame-based transmission in the GSM: the NIC codes are split and sent in successive frames. This, however, would mean a strict restriction to the maximum length of the user data protocol frame, so that the NIC-code repetition frequency would remain sufficiently high. The NIC used in the GSM is described in European Telecommunications Standard Institute (ETSI) recommendation 04.21, version 4.4.0, paragraph 5.1. For example, if two bits were available, one bit would be used to form a superframe structure and the other to carry a 5-bit NIC code in five successive user protocol frames. This would restrict the maximum length of the user protocol frame to 250 bytes (Fame headers and flags included).

It is an object of the invention to alleviate or eliminate the above problems.

The invention relates to a method for network independent clocking in a telecommunication network. The method is characterized by receiving user data and an associated network independent clock for a transmitter, comparing the network independent clock with a network clock that is used as the transmitter's transmission clock, performing compensation of the network independent clock in the transmitter by changing the number of redundant bits in the user data, transmitting the user data through a traffic channel or a group of traffic channels to a receiver, performing compensation of the network independent clock in the receiver by restoring the original redundancy, temporarily adjusting the outbound network independent clock in the receiver so as to compensate for the change caused by the restoration of the redundancy in the outbound user data stream.

The invention also relates to transmission and reception equipment according to claim 9.

The basis of the present invention is that the network independent clocking is adjusted through a traffic channel in the redundant data elements of end-to-end protocols, such as the redundant parts of the protocol data units of user data. The overhead information thus does not increase the number of the bits to be transmitted, so the data rate on the traffic channel can be the same as the user data rate at the terminal interface. In high-rate data transmission the data frame can comprise a group of two or more traffic channels, whereby the total data rate of the group of traffic channels can be the same as the user data rate at the terminal interface.

In the invention the transmitter compares the inbound network independent clock and the network clock in order to detect slipping. The slipping can be detected in many different ways. In a preferred embodiment of the invention, the transmitter counts the number of the bit sequences (total durations of data bits) that the first clock (e.g. network clock) skips in respect of the second clock. In a second embodiment of the invention, the transmitter monitors the fill level of the transmission buffer. In the present application, a positive skip refers to a case where the inbound network independent clock is faster than the network clock, which means that within a certain period of time the number of network clock bit sequences is lower than the number of network independent clock bit sequences, i.e. the network clock skips network independent clock bit sequences and the transmission buffer fills up. In the present application, a negative skip refers to a case where the network independent clock is slower than the network clock, which means that within a certain period of time the number of network clock bit sequences is higher than the number of network independent clock bit sequences, i.e. the network independent clock skips network clock bit sequences and the transmission buffer is emptied. The corresponding NIC compensations are called positive and negative NIC compensations.

When the transmitter has counted a predetermined number n of skipped bit sequences or the transmission buffer has filled up to a certain level, it drops n redundant bits from the currently transmitted user data protocol frame in positive NIC compensation (positive skip) or adds n redundant bits in the currently transmitted user data protocol frame in negative NIC compensation (negative skip). In addition, the transmitter can indicate the NIC compensation by means of one or more redundant bits remaining in the user data protocol frame. This kind of indication, however, is not needed, if the receiver is able to detect the addition or deletion of redundant bits in some other way.

In another embodiment of the invention, when the transmitter has counted the predetermined number n of skipped bit sequences or the transmission buffer has been emptied to a certain level, the transmitter drops n redundant bits from the next m user data protocol frames to be transmitted where positive NIC compensation is concerned (positive skip), or the transmitter adds n redundant bits to the next m user data protocol frames to be transmitted where negative NIC compensation is concerned (negative skip). In addition, the transmitter indicates by means of one or more remaining redundant bits of the user data protocol frame to be transmitted that a predetermined amount of redundancy has been deleted from the next m frames or that a predetermined amount of redundancy has been added. In this embodiment, the indication, if necessary, is sent only in every $m^{th}$ frame. The more effective indication supports longer frames.

Upon detecting the positive NIC compensation in the received user protocol data frame, the receiver restores the known original redundancy in the positions of the bits deleted by the transmitter. In addition, the receiver temporarily speeds up the outbound network independent clock to make room for the added bits in the outbound bit stream.

Upon detecting negative NIC compensation in the received user protocol data frame, the receiver deletes the known bit stuffing added by the transmitter. In addition, the receiver temporarily slows down the outbound network independent clock to fill the gap caused by the deletion of bits in the outbound bit stream.

The invention makes it possible to increase the maximum length of the user data protocol frame. For example, if four redundant bits could be dropped from the frame for the positive NIC compensation, the average available frame length during a transmission session (±100 ppm clock tolerance) would be 40000 bits, i.e. 5000 bytes. The more bits to be dropped there are in the frame, the greater the average length of the frames. If the same four bits were used by the present NIC coding of the GSM, two frames would be needed for compensating for a slip of one bit. The average allowable frame length during a transmission session (±100 ppm clock tolerance) would be 5000 bits, i.e. 625 bytes.

BRIEF DESCRIPTION OF THE SEVERAL VIEWS OF THE DRAWINGS

In the following the invention will be described by means of preferred embodiments with reference to the attached drawings, in which.

DETAILED DESCRIPTION OF THE INVENTION

The present invention can be applied to data transmission through any traffic channel whose maximum data rate is equal to or slightly higher than the user data rate at the terminal interface. The implementation of the traffic channel can be based on any multiple access technique, such as time division multiple access (TDMA) and code division multiple access (CDMA). The invention is obviously applicable in the new 14400 bit/s channel type of the GSM, the 9600 bit/s channel type of the CDMA, and the 4800 kbit/s channel type of the Inmarsat-P satellite system.

The preferred embodiments of the invention will be described below with reference to a 14400 kbit/s traffic channel of a GSM-based mobile system. The invention, however, is not to be understood as being limited to these systems.

The structure and the operation of the GSM mobile system, defined in the GSM specifications of the ETSI (European Telecommunications Standards Institute), are well known to those skilled in the art. Reference is also made to *GSM System for Mobile Communication* by M. Mouly and M. Pautet, Palaiseau, France, 1992; ISBN:2-9507190-0-7. The GSM-based mobile systems include the DCS1800 (Digital Communication System) and the U.S. digital cellular system PCS (Personal Communication System).

Figure 1A:
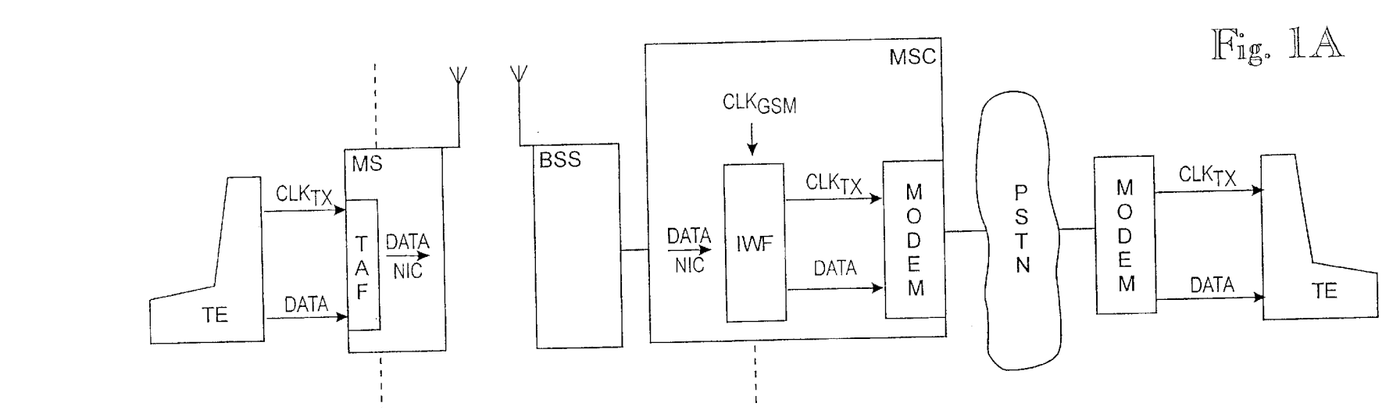
FIGS. 1A and 1B illustrate present network independent clocking in MS-originated and MS-terminating data transmission in the GSM.
Figure 1B:
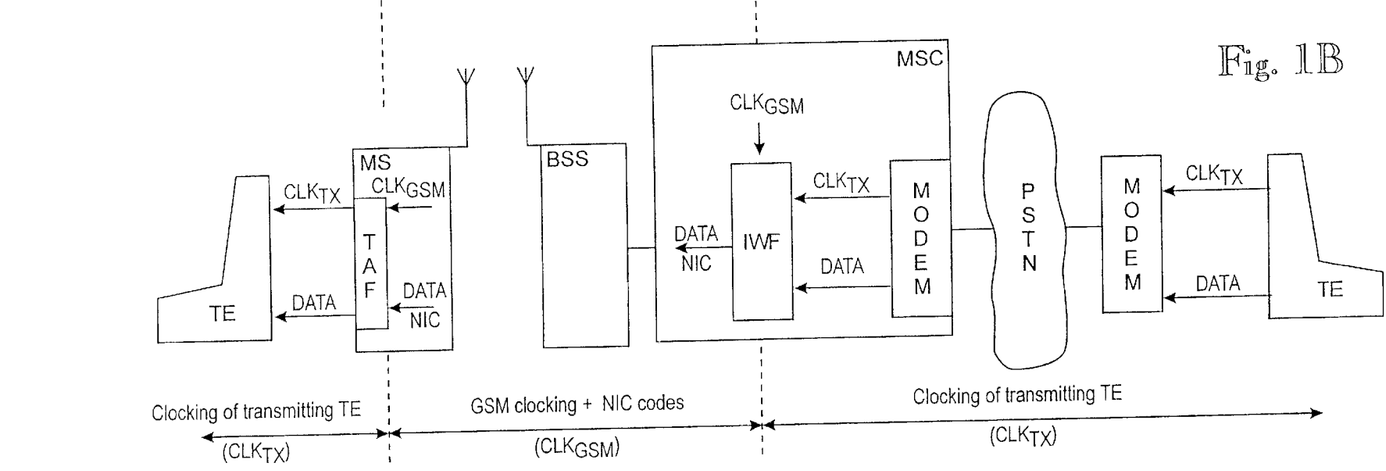
Figures 2A, 2B:
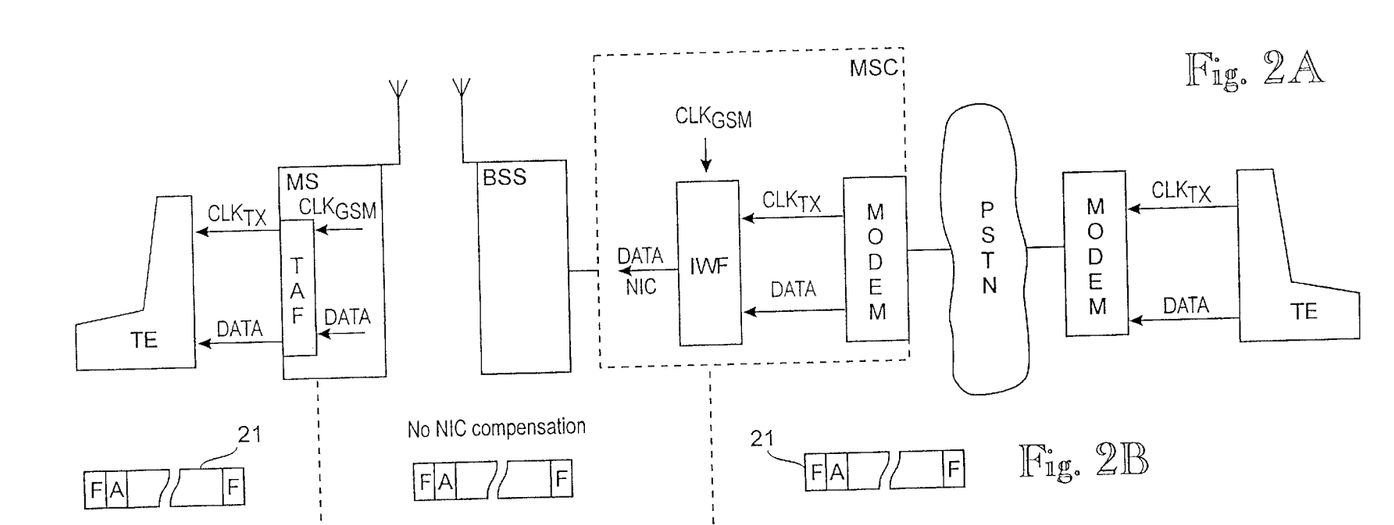
FIGS. 2A, 2B, 2C and 2D illustrate network independent clocking according to the invention in MS-terminating data transmission in the GSM network.

With reference to FIGS. 1A, 1B and 2A, the GSM infrastructure comprises two parts: a base station system (BSS) and a network subsystem (NSS). The BSS and the mobile stations (MS) communicate via radio connections. In the base station system BSS, each cell is served by a base station (BTS) (not shown). A number of base stations are connected to a base station controller (BSC) (not shown), which controls the radio frequencies and channels used by the BTS. The BSSs are connected to a mobile services switching center (MSC). Certain MSCs are connected to other telecommunication networks, such as the public switched telephone-network (PSTN) and the Integrated Services Digital Network (ISDN).

In the GSM system, a data link is established between a terminal adaptation function TAF of an MS and an inter-working function (IWF) in the mobile network (usually in the MSC). In data transmission taking place in the GSM network, this connection is a V.110 rate-adapted, UDI-coded digital fall duplex connection that adapts to V.24 interfaces. The V.110 connection described herein is a digital transmission channel originally developed for ISDN (Integrated Services Digital Network) technology. It adapts to a V.24 interface, and also allows transmission of V.24 statuses (control signals). The CCITT recommendation for a V.110 rate-adapted connection is presented in the CCITT Blue Book: V.110. The CCITT recommendation for a V.24 interface is presented in the CCITT Blue Book: V.24. In non-transparent data services, a GSM connection also employs a radio link protocol (RLP). The TAF adapts a data terminal TE connected to the MS to the above-mentioned GSM V.110 data link, which is established over a physical connection utilizing one or more traffic channels (HSCSD). The OF comprises a rate adapter that adapts the GSM V.110 data link to a V.24 interface, and a data modem or another rate adapter, depending on whether the connection is extended to the PSTN or the ISDN. The ISDN protocols may be, for example, V.110 or V.120. In the ISDN or the PSTN, the data link is established, for example, to another data terminal TE. The V.24 interface between the MS and the TE is here called a terminal interface. A corresponding terminal interface is also found in the IWF, and for the other data terminal TE in the ISDN or the PSTN. The protocol used between the terminal equipments TE can be, for example, a HDLC protocol described in ITU-T recommendation X.25 or, in facsimile transmission, a protocol according to ITU-T T.30.

In the GSM, data is typically transmitted in TRAU data frames between the base station BTS and a specific transcoder unit TRCU (Transcoder/Rate Adaptor Unit) in the network. At present, the TRAU data frame is a 320-bit frame (20 ms), whereby the intermediate rate is 16000 bit/s at the present user data rates. The TRAU data frame and its use are defined in GSM recommendation 08.60.

A GSM traffic channel supports data transmission at user rates 2400, 4800, 7200 and 9600 bit/s. In the future, high-speed data services (HSCSD=high speed circuit switched data) employing two or more traffic channels at a radio interface (multi-slot access) will also support higher user rates (14400 bit/s, 19600 bit/s, . . . ) In addition to user data, terminal interface status information (V.24 interface control signals), such as CT105 (RTS=request to send), CT108 (DTR=data terminal ready), CT106 (CTS=clear to send), CT107 (DSR=data set ready) and CT109 (CD=data carrier detect), is also transmitted in V.110 frames in both transmission directions. in the V.110 frames are also transmitted NIC code words. In multichannel transparent HSCSD data service it is also necessary to transmit inter-subchannel synchronization information by which the order of data bits received from different subchannels can be restored in the receiver. The above-mentioned additional information raises the bit rate at the radio interface to be higher than the actual user rate. The radio interface rates corresponding to user rates 2400, 4800 and 9600 bit/s are 3600, 6000 and 12000 bit/s.

The frame structure used for data transmission over a V.110 connection is described in greater detail e.g. in the GSM recommendations, and in Finnish Patent Applications No. 955,496 and 955,497.

As stated above in describing the background of the invention, the network independent clocking according to GSM recommendation 04.21 is based on the transmission of 5-bit NIC code words in bits E4 to E7 of V.110 frames. This is possible in standard GSM traffic channels in which extra capacity is reserved for the transmission of necessary status and synchronization information as well as of the user data. As also described above in greater detail, problems arise when the NIC compensation should be performed on a traffic channel in which the radio interface rate is the same as the user data rate. Let us now study a 14400 bits/s traffic channel, in which there is no extra capacity (radio interface rate of 14400 bits/s).

Radio Interface Rate of 14400 bit/s

As stated above, the 14400 bit/s radio interface rate can be formed from the 12000 bit/s radio interface rate by increasing puncturing. The puncturing deletes some of the channel-coded bits before transmission in accordance with a predetermined rule. The capacity obtained from the channel coding can be used to raise the radio interface rate (data rate before and after channel coding) to 14400 bit/s. In channel coding, for example a 72-bit information block can be supplied to a channel coder every 5 ms. Four such blocks are concatenated in the coding process, and four tail bits are added. The result is a 292-bit block, coded with a ½-rate convolution code. The coding yields 584 coded bits. The coding is punctured so that 128 bits (every $5^{th}$ bit) are not transmitted. The result is a block of 456 coded bits, which corresponds to the rate of 14400 bit/s.

In-band NIC Compensation on a 14400 bit/s Traffic Channel

In the invention, the NIC compensation is performed on a traffic channel by utilizing the redundant data elements of the end-to-end protocols, such as the redundant parts of the protocol data units of the user data or the start and stop bits of the asynchronous data characters. In other words, all NIC information is transmitted transparently inside the user data stream. The general principle of the invention is described in the following by means of MS-terminating data transmission with reference to FIGS. 2A, 2B, 2C and 2D. User data frames 21 are assumed to be a HDLC frame according to FIG. 3 in which the redundant part is an 8-bit address field ADDRESS (in FIGS. 2B, 2C and 2D, the opening and closing flags of frames 21 are indicated by F and the address fields by A).

The operations described below are typically identical in the opposite direction of transmission TAF-IWF, except that the TAF functions as a transmitter and the IWF as a receiver.

The terminal equipment TE of the public switched telephone network PSTN supplies user data DATA and a transmission clock $Clk_{TX}$ (network independent clock) through the terminal interface to a modem MODEM. The modem MODEM communicates through the PSTN with the modem MODEM of the interworking function IWF of the mobile services switching center (MSC). The modem of the IWF supplies the received user data and transmission clock $Clk_{TX}$ to the IWF. The IWF compares the network independent clock $Clk_{TX}$ and the network clock $CLK_{GSM}$ to detect slipping. The network clock $CLK_{GSM}$ is used to synchronize the data transmission on the connection IWF-TAF on a GSM traffic channel. The allowed tolerance for the clocks can be, for example, 100 ppm. The slipping can be detected in many different ways. In a preferred embodiment of the invention, the of counts the number of the bit sequences (total durations of data bits) that the first clock (e.g. network clock $CLK_{GSM}$) skips in respect of the second clock. The case $Clk_{TX}>CLK_{GSM}$ is called a positive skip and the case $Clk_{TX}<CLK_{GSM}$ a negative skip. They are corrected by positive and negative NIC compensation, respectively. In another embodiment of the invention the IWF monitors the fill level of the transmission buffer.

Positive NIC Compensation in Transmission

Figure 2C:
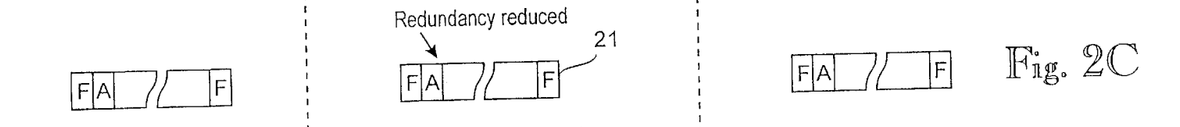

When the IWF has counted a predetermined number n of positive-skipped ($Clk_{TX}>CLK_{GSM}$) bit sequences or the transmission buffer has filled up to level TH1, the IWF drops n redundant bits from the currently transmitted user data protocol frame 21 in the positive NIC compensation (e.g. the last three bits from address field A of the HDLC frame) in accordance with FIG. 2C. In addition, the IWF can indicate the NIC. compensation by means of one or more redundant bits remaining in the user data protocol frame 21 (e.g. the first two bits of the address field A of the HDLC frame can be used as follows: 00=no NIC compensation, 01=positive NIC compensation, and 10=negative NIC compensation). This kind of indication is not needed, however, if the receiver is able to detect the deletion of redundant bits in some other way (e.g. from the length of the address field A of the HDLC frame).

In another embodiment of the invention, when the IWF has counted a predetermined number n of positive-skipped bit sequences or when the transmission buffer has filled up to threshold level TH1, the IWF drops n redundant bits from the next m user data protocol frames 21 to be transmitted where positive NIC compensation is concerned. In addition, the IWF indicates, by means of one or more redundant bits of the user protocol data frame to be transmitted (e.g. the first two bits of the address field A of the HDLC frame), that a predetermined amount of redundancy (n bits) has been deleted from the next m frames F. In this embodiment, the indication, if necessary, is transmitted in every $m^{th}$ user data frame 21.

The user data frames 21 are transmitted through a GSM traffic channel to the TAF of the MS.

Positive NIC Compensation in Reception

Upon detecting positive NIC compensation in the received user protocol data frames 21 (e.g. by means of an indication added by the IWF), the TAF restores the original known redundancy in the positions of the bits deleted by the IWF. In addition, the TAF temporarily speeds up the transmission clock $Clk_{TX}$ supplied to the terminal equipment TE so as to make room for the added bits in the user data bit stream DATA, which is also supplied to the TE.

Negative NIC Compensation in Transmission

Figure 2D:
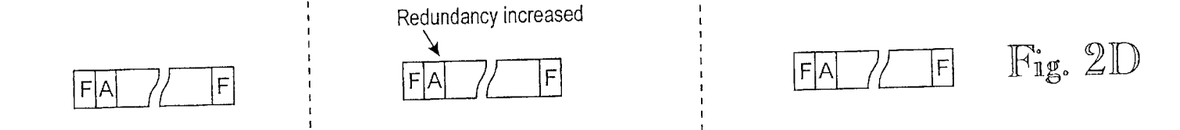

When the IWF has counted a predetermined number n of negative-skipped ($Clk_{TX}<CLK_{GS}$) bit sequences or when the transmission buffer has been emptied to level TH2, the IWF puts n redundant bits in a predetermined position in the currently transmitted user data protocol frame 21 where negative NIC compensation is concerned (e.g. three bits between the ADDRESS field and the control field CONTROL of the HDLC frame) in accordance with FIG. 2D. In addition, the IWF can indicate the NIC compensation in the same way as in the positive NIC compensation. No separate indication is needed, however, if the receiver can detect the existence of redundant bits in some other way (e.g. so that the added bits repeat a field or form a flag).

In another embodiment of the invention, the IWF adds n redundant bits to the next m user protocol data frames 21 to be transmitted where positive NIC compensation is concerned. In addition, the IWF indicates by means of two or more redundant bits of the currently transmitted user protocol data frame 21 (e.g. the first two bits of the address field A of the HDLC frame) that a predetermined amount of redundancy (n bits) has been added to the next m frames 21. In this embodiment, the indication, if necessary, is transmitted only in every $m^{th}$ user data frame 21.

Negative NIC Compensation in Reception

Upon detecting negative NIC compensation in the received user protocol data frame 21, the TAF deletes the bit stuffing added by the transmitter. In addition, the TAF temporarily slows down the outbound network independent clock $Clk_{TX}$ to fill the gap caused by the deletion of bits in the outbound bit stream DATA, which is supplied to the terminal equipment TE.

Examples of User Protocol Redundancy

Figure 3:
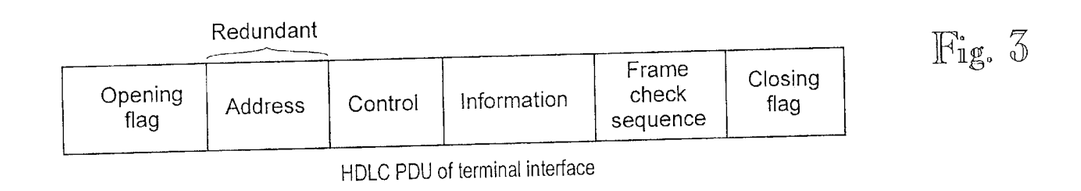
FIG. 3 shows a standard HDLC frame.

With reference to FIG. 3 we shall now give an example of the redundancy of user protocols that can be employed in the present invention. Such examples have also been described in Finnish Patent Application 955,496 by the same Applicant, which is incorporated herein by reference.

In Finnish Patent Application 955,496, the terminal interface status information and any other control or synchronization information are transmitted through a traffic channel in the redundant parts of the protocol data units of the current transmission protocol or protocols. At the receiving end the status information and any other information are separated from the protocol data units, and the original redundancy is restored to the protocol data units. The basis of this synchronous transmission is that the frame structures of many transmission protocols comprise redundant bits when they are used in the PLMN environment, e.g. in the GSM network, or as a result of repetition occurring in them, or for some other such reason.

For example, the bearer services of the PLMN networks use a point-to-point connection, i.e. a circuit-switched connection is used between two points. Most transmission protocols are also meant for point-to-multipoint connections, in which case their frame structure comprises an address field. The address field is redundant on a point-to-point connection, whereby it can be used for the NIC compensation according to the invention. The protocols include, for example, HDLC-based (high level data link control) protocols.

Satellite System

Figure 4:
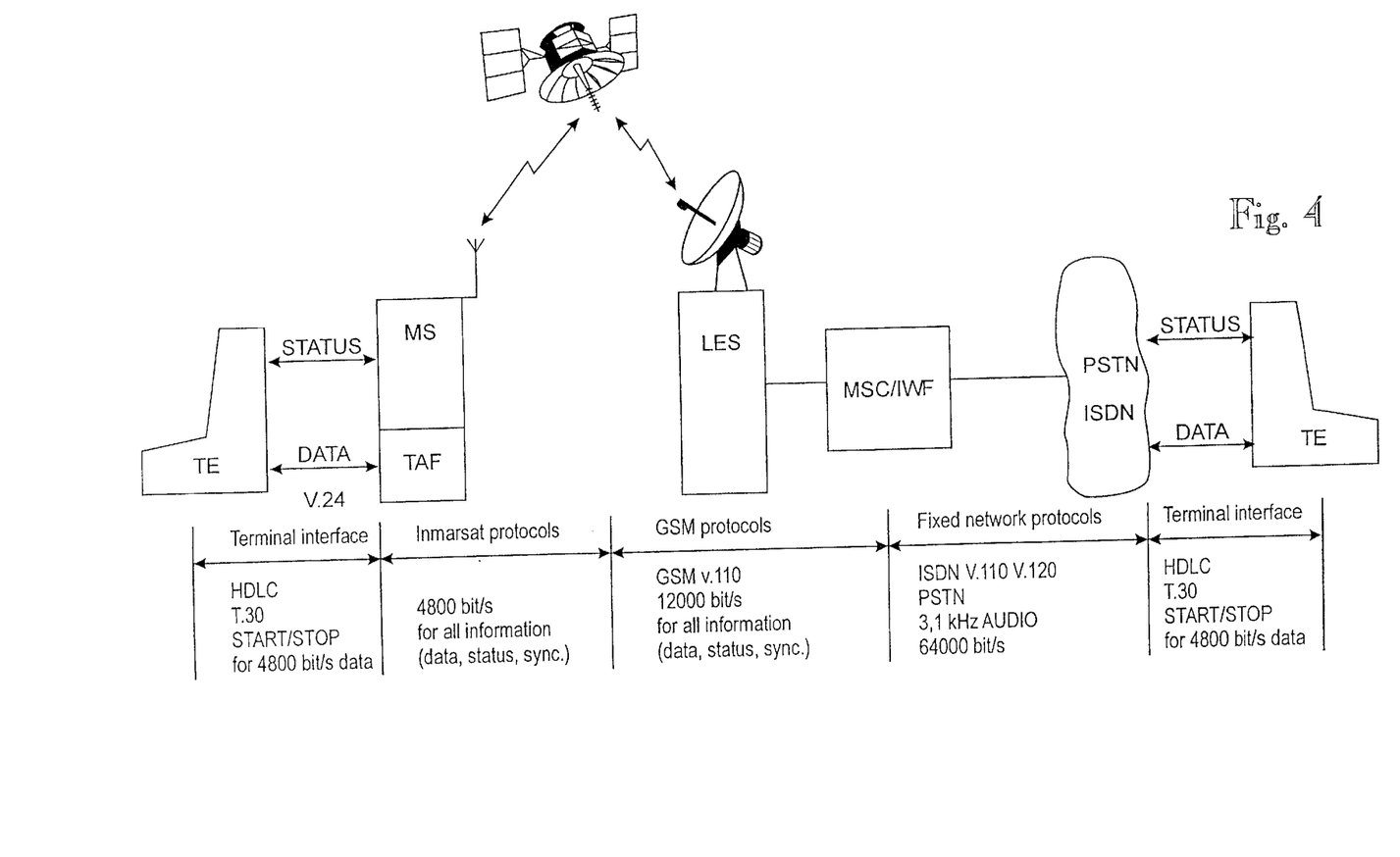
FIG. 4 is a block diagram illustrating how the Inmarsat-P satellite system can be connected as a base station system to a GSM-based mobil system.

FIG. 4 shows a GSM-based mobile system in which the base station system is the Inmarsat satellite system. For the sake of clarity, the figure shows only one land earth station LES, one satellite SAT and one mobile station MS (or user terminal UT). The land earth station LES is connected to the MSC of the GSM network in the same way as the base station system BSS in FIG. 1. The GSM protocols between the MSC and the LES are also the same as between the MSC and the BSS in FIG. 1 (GSM V.110). The terminal interface and its protocols (HDLC, T.30) and the protocols of the fixed network (ISDN V.110/V.120 or PSTN 3.1 kHz audio) are also the same as in FIG. 1. The difference is that in FIG. 4 the GSM V.110 connection is not used on the connection MSC-MS, but the Inmarsat protocols and traffic channels are used at the radio interface LES-MS. The maximum data rate on a traffic channel of the Inmarsat-P system is 4800 bit/s, whereby NIC compensation cannot be performed through the traffic channel when the user data rate is 4800 bites. The invention can also be applied here in the same way as described above with reference to FIG. 2.

The redundant data elements of the end-to-end protocols can be used to transmit for example terminal interface statuses and/or synchronization information of the HSCSD subchannels as well as in the NIC compensation. The redundant bits of a user data frame, which are already used for another purpose, can also contain redundancy and thereby be applicable for use in the NIC compensation. For example, the terminal interface status bits are redundant for as long as the statuses remain unchanged. The HSCSD subchannel numbering may also be redundant almost all the time, since the receiver may be able to know beforehand the correct order of the frames (until the next handover or disconnection of the corresponding channel).

The figures and the associated description are only intended to illustrate the present invention. The invention can vary in its details within the scope and spirit of the attached claims.

What is claimed is:

1. A method for network independent clocking in a telecommunication system, comprising inputting end-to-end user data and an associated network independent clock to a transmitter, comparing the network independent clock with a network clock that is used as the transmitter's transmission clock, performing compensation of the network independent clock in the transmitter by changing the number of redundant bits in the end-to-end user data, transmitting the end-to-end user data to a receiver through a traffic channel or a group of traffic channels having a radio interface rate equal to an end-to-end user data rate and thereby having no extra capacity for sending any outband information on the compensation of the network independent clock, performing compensation of the network independent clock in the receiver by restoring the original redundancy in the end-to-end user data, and temporarily adjusting the outbound network independent clock in the receiver so as to compensate for the change caused by the restoration of the redundancy in the outbound user data stream.

2. A method for network independent clocking in a telecommunication system, comprising inputting end-to-end user data and an associated network independent clock to a transmitter, comparing the network independent clock with a network clock that is used as the transmitter's transmission clock, performing compensation of the network independent clock with a network clock in the transmitter by deleting a predetermined number of bits from one or more redundant data elements of the end-to-end user data for positive compensation of the network independent clock, when a predetermined positive slip is detected between the network clock and the network independent clock, adding a predetermined number of bits to one or more redundant data elements of the end-to-end user data for negative compensation of the network independent clocking, when a predetermined negative slip is detected between the network clock and the network independent clock, transmitting the user data to a receiver through the traffic channel or a group of traffic channels having a radio interface rate equal to an end-to-end user data rate and thereby having no extra capacity for sending any outband information on the compensation of the network independent clock, performing compensation of the network independent clock in the receiver by restoring the original redundancy in the end-to-end user data by, deleting a predetermined number of bits from one or more redundant data elements of the received end-to-end user data, and temporarily slowing down the outbound network independent clock, when the negative compensation performed by the transmitter is detected, adding a predetermined number of bits to one or more redundant data elements of the received end-to-end user data, and temporarily speeding up the outbound network independent clock, when the positive compensation performed by the transmitter is detected, and temporarily adjusting the outbound network independent clock in the receiver so as to compensate for the change caused by the restoration of the redundancy in the outbound user data stream.

3. A method according to claim 1, further comprising counting the number of the bit sequences of the network independent clock that the network clock skips, performing positive compensation when a predetermined number of skipped bit sequences of the network independent clock has been counted, counting the number of the bit sequences of the network clock that the network independent clock skips, performing negative compensation when a predetermined number of skipped bit sequences of the network clock have been counted.

4. A method according to claim 1, further comprising monitoring the fill level of the transmitter's transmission buffer, performing positive compensation when the fill level of the transmission buffer rises up to a predetermined first threshold level, performing negative compensation when the fill level of the transmission buffer drops down to a predetermined second threshold level.

5. A method for network independent clocking in a telecommunication system, comprising inputting end-to-end user data and an associated network independent clock to a transmitter, comparing the network independent clock with a network clock that is used as the transmitter's transmission clock, performing compensation of the network independent clock in the transmitter by changing the number of redundant bits in the end-to-end user data, transmitting the user data to a receiver through a traffic channel or a group of traffic channels having a radio interface equal to an end-to-end user data rate and having no extra capacity for sending any outband information on the compensation of the network independent clock, indicating by one or more redundant bits in the end-to-end user data that positive or negative compensation has been performed in the end-to-end user data, performing compensation of the network independent clock in the receiver by restoring the original redundancy in the end-to-end user data, temporarily adjusting the outbound network independent clock in the receiver so as to compensate for the change caused by the restoration of the redundancy in the outbound user data stream.

6. A method for network independent clocking in a telecommunication system, comprising inputting end-to-end user data and an associated network independent clock to a transmitter, comparing the network independent clock with a network clock that is used as the transmitter's transmission clock, performing compensation of the network independent clock in the transmitter for m data units of end-to-end protocols of user data by deleting a predetermined number of bits from one or more redundant data elements in each of said m data units for positive compensation of the network independent clock, when a predetermined positive slip is detected between the network clock and the network independent clock, adding a predetermined number of bits to one or more redundant data elements in each of said m data units for negative compensation of the network independent clocking, when a predetermined negative slip is detected between the network clock and the network independent clock, transmitting the user data to a receiver through a traffic channel or a group of traffic channels having a radio interface rate equal to an end-to-end user data rate, indicating by one or more redundant bits of the first one of said m data units that a predetermined number of redundant bits have been deleted or added in the next m data units, performing compensation of the network independent clock in the receiver by restoring the original redundancy in the end-to-end user data by, deleting a predetermined number of bits from one or more redundant data elements of the received end-to-end user data, and temporarily slowing down the outbound network independent clock, when the negative compensation performed by the transmitter is detected, adding a predetermined number of bits to one or more redundant data elements of the received end-to-end user data, and temporarily speeding up the outbound network independent clock, when the positive compensation performed by the transmitter is detected, and temporarily adjusting the outbound network independent clock in the receiver so as to compensate for the change caused by the restoration of the redundancy in the outbound user data stream.

7. A method for network independent clocking in a telecommunication system, comprising inputting end-to-end user data and an associated network independent clock to a transmitter, comparing the network independent clock with a network clock that is used as the transmitter's transmission clock, performing compensation of the network independent clock in the transmitter for m data units of the end-to-end user data by deleting a predetermined number of bits from one or more redundant data~elements in each of said m data units for positive compensation of the network independent clock, when a predetermined positive slip is detected between the network clock and the network independent clock, adding a predetermined number of bits to one or more redundant data elements in each of said m data units for negative compensation of the network independent clocking, when a predetermined negative slip is detected between the network clock and the network independent clock, transmitting the user data to a receiver through a traffic channel or a group of traffic channels having a radio interface rate equal to an end-to-end user data rate, detecting the positive or negative compensation performed by the transmitter from the content of said m data units in the receiver without said m data units containing any indication of the compensation added by the transmitter, performing compensation of the network independent clock in the receiver by restoring the original redundancy in the end-to-end user data by, deleting a predetermined number of bits from one or more redundant data elements of the received end-to-end user data, and temporarily slowing down the outbound network independent clock, when the negative compensation performed by the transmitter is detected, adding a predetermined number of bits to one or more redundant data elements of the received end-to-end user data, and temporarily speeding up the outbound network independent clock, when the positive compensation performed by the transmitter is detected, and temporarily adjusting the outbound network independent clock in the receiver so as to compensate for the change caused by the restoration of the redundancy in the outbound user data stream.

8. A method according to claim 1, further comprising performing compensation of the network independent clock by redundant bits located in the address field of an end-to-end transmission protocol supporting point-to-multipoint transmission in a telecommunication system that supports point-to-point transmission.

9. Transmission and reception equipment supporting network independent clocking, comprising:

the transmission equipment comprising an input for user data and for an associated network independent clock, the transmission equipment being arranged to compare the network independent clock with a network clock, which is used as the transmission clock of the transmission equipment, the transmission equipment being arranged to delete a predetermined number of bits from one or more redundant data elements of end-to-end protocols of user data for positive compensation of the network independent clock, when a predetermined positive slip is detected between the network clock and the network independent clock, the transmission equipment being arranged to add a predetermined number of bits to one or more redundant data elements of end-to-end protocols of the user data for negative compensation of the network independent clock, when a predetermined negative slip is detected between the network chock and the network independent clock, the reception equipment being arranged to delete a predetermined number of bits from one or more redundant data elements of the end-to-end protocols of the user data and to temporarily slow down the outbound network independent clock when the negative compensation performed by the transmitter is detected, the reception equipment being arranged to add a predetermined number of bits to one or more redundant data elements of the end-to-end protocols of the user data and to temporarily speed up the outbound network independent clock when the positive compensation performed by the transmitter is detected a first counter, which counts the number of the bit sequences of the network independent clock that the network clock skips, the transmission equipment being arranged to perform positive compensation when the first counter reaches a predetermined value;

a second counter, which counts the number of the bit sequences of the network clock that the network independent clock skips, the transmission equipment being arranged to perform negative compensation when the second counter reaches predetermined value.

10. Transmission and reception equipment according to claim 9, further comprising means for monitoring the fill level of the transmitter's transmission buffer, the transmission equipment being arranged to perform positive compensation when the fill level of the transmission buffer rises up to a first predetermined threshold value, the transmission equipment being arranged to perform negative compensation when the fill level of the transmission buffer drops down to a second predetermined threshold value.

11. Transmission and reception equipment according to any one of claims 9 and 10, wherein the equipment is at least one of a terminal adaptation function of a mobile station, an interworking function of a mobile network and a land earth station of a satellite system.

12. Transmission and reception equipment according to claim 9, wherein a nominal user data rate on the traffic channel, a radio interface rate and a user data rate at the radio interface are equal, for example 14400 bit/s or 4800 bit/s.

13. Transmission and reception equipment according to claim 9, wherein said redundant data elements of the end-to-end protocols of user data comprises the address field of an end-to-end transmission protocol supporting point-to-multipoint transmission in a telecommunication system that supports point-to-point transmission.

14. Transmission and reception equipment supporting network independent clocking, comprising the transmission equipment comprising an input for user data having a first user data rate and for an associated network independent clock, the transmission equipment being arranged to compare the network independent clock with a network clock, which is used as the transmission clock of the transmission equipment, the transmission equipment being arranged to delete a predetermined number of bits from one or more redundant data elements of end-to-end protocols of user data for positive compensation of the network independent clock, when a predetermined positive slip is detected between the network clock and the network independent clock, the transmission equipment being arranged to add a predetermined number of bits to one or more redundant data elements of end-to-end protocols of the user data for negative compensation of the network independent clock, when a predetermined negative slip is detected between the network clock and the network independent clock, the transmission equipment being arranged to transmit the user data through a traffic channel or a group of traffic channels having a radio interface rate equal to said first user data rate and thereby having no extra capacity for sending any outband information on the compensation of the network independent clock, the reception equipment being arranged to delete a predetermined number of bits from one or more redundant data elements of the end-to-end protocols of the received user data and to temporarily slow down the outbound network independent clock when the negative compensation performed by the transmitter is detected, the reception equipment being arranged to add a predetermined number of bits to one or more redundant data elements of the end-to-end protocols of the received user data and to temporarily speed up the outbound network independent clock when the positive compensation performed by the transmitter is detected, and a nominal user data rate on said traffic channel or said group of traffic channels, a radio interface rate, and said first user data rate at said radio interface being substantially equal.

15. A method for network independent clocking in a telecommunication system, comprising inputting end-to-end user data having a first user data rate, and an associated network independent clock to a transmitter, comparing the network independent clock with a network clock that is used as the transmitter's transmission clock, performing compensation of the network independent clock in the transmitter by changing the number of redundant bits in the end-to-end user data, transmitting the end-to-end user data through a traffic channel or a group of traffic channels to a receiver, wherein a nominal user data rate on said traffic channel or said group of traffic channels and a radio interface rate are substantially equal to said first user data rate at a radio interface and thereby provide no extra capacity for sending any outband information on the compensation of the network independent clock, performing compensation of the network independent clock in the receiver by restoring the original redundancy in the end-to-end user data, temporarily adjusting the outbound network independent clock in the receiver so as to compensate for the change caused by the restoration of the redundancy in the outbound user data stream.

16. A method for network independent clocking in a telecommunication system, comprising inputting end-to-end user data in form of HDLC frames, and an associated network independent clock to a transmitter, comparing the network independent clock with a network clock that is used as the transmitter's transmission clock, performing compensation of the network independent clock in the transmitter by deleting a predetermined number of bits from one or more redundant data elements of the HDLC frames for positive compensation of the network independent clock, when a predetermined positive slip is detected between the network clock and the network independent clock, adding a predetermined number of bits to one or more redundant data elements of the HDLC frames for negative compensation of the network independent clocking, when a predetermined negative slip is detected between the network clock and the network independent clock, transmitting the end-to-end user data to a receiver through a traffic channel or a group of traffic channels having a radio interface rate equal to an end-to-end user data rate and thereby having no extra capacity for sending any outband information on the compensation of the network independent clock, indicating by one or more redundant bits of the HDLC frames of the received end-to-end user data that positive or negative compensation has been performed in the end-to-end user data, performing compensation of the network independent clock in the receiver by restoring the original redundancy in the end-to-end user data by, deleting a predetermined number of bits from one or more redundant data elements of the HDLC frames of the received end-to-end user data, and temporarily slowing down the outbound network independent clock, when the negative compensation performed by the transmitter is detected, adding a predetermined number of bits to one or more redundant data elements of the HDLC frames of the received end-to-end user data, and temporarily speeding up the outbound network independent clock, when the positive compensation performed by the transmitter is detected, and temporarily adjusting the outbound network independent clock in the receiver so as to compensate for the change caused by the restoration of the redundancy in a outbound user data stream.

17. Transmission and reception equipment supporting network independent clocking, comprising the transmission equipment comprising an input for user data that is in form of HDLC frames, and for an associated network independent clock, the transmission equipment being arranged to compare the network independent clock with a network clock, which is used as the transmission clock of the transmission equipment, the transmission equipment being arranged to delete a predetermined number of bits from one or more redundant data elements of the HDLC frames for positive compensation of the network independent clock, when a predetermined positive slip is detected between the network clock and the network independent clock, the transmission equipment being arranged to add a predetermined number of bits to one or more redundant data elements of the HDLC frames for negative compensation of the network independent clock, when a predetermined negative slip is detected between the network clock and the network independent clock, the transmission equipment being arranged to indicate by means of one or more redundant bits of the HDLC frames of the received end-to-end user data that positive or negative compensation has been performed in the end-to-end user data, the reception equipment being arranged to delete a predetermined number of bits from one or more redundant data elements of the HDLC frames of the received user data and to temporarily slow down the outbound network independent clock when the negative compensation performed by the transmitter is detected, the reception equipment being arranged to add a predetermined number of bits to one or more redundant data elements the HDLC frames of the received user data and to temporarily speed up the outbound network independent clock when the positive compensation performed by the transmitter is detected.

* * * * *